United States Patent

[11] 3,619,474

| [72] | Inventor | August Beck |
| | | Langenhagen, Germany |
| [21] | Appl. No. | 828,481 |
| [22] | Filed | May 28, 1969 |
| [45] | Patented | Nov. 9, 1971 |
| [73] | Assignee | Kabel-und Metallwerke |
| | | Gutehoffnungshutte Aktiengesellschaft |
| | | Hannover, Germany |
| [32] | Priority | June 1, 1968 |
| [33] | | Germany |
| [31] | | P 17 65 532.2 |

[54] SPACER ASSEMBLY FOR COAXIAL TUBULAR SYSTEMS
9 Claims, 12 Drawing Figs.

[52] U.S. Cl. ................................................ 174/29, 174/15 C
[51] Int. Cl. ..................................................... H01b 9/04
[50] Field of Search ........................................... 174/28, 29, 111 S, 111 C, 99, 15 C; 138/112–114, 122, 148, 149, 177, 178

[56] References Cited
UNITED STATES PATENTS
| 2,167,538 | 7/1939 | Turk et al. .................... | 174/28 |

FOREIGN PATENTS
| 1,127,420 | 4/1962 | Germany ...................... | 174/29 |
| 482,912 | 4/1938 | Great Britain ................ | 174/29 |
| 1,129,346 | 10/1968 | Great Britain ................ | 174/28 |
| 984,958 | 7/1951 | France ......................... | 174/29 |
| 1,189,571 | 10/1959 | France ......................... | 174/29 |

Primary Examiner—Lewis H. Myers
Assistant Examiner—A. T. Grimley
Attorney—Philip G. Hilbert ABSTRACT: Spacer assemblies for maintaining a plurality of tubular members in concentric relation to provide maximum heat insulation and minimum temperature losses; the system of concentric tubular members being used for carrying cable components under supercooled conditions or transmitting liquids or gases under predetermined temperature conditions.

INVENTOR.
August Beck
BY
*Philip F. Hilbert*
ATTORNEY

3,619,474

SPACER ASSEMBLY FOR COAXIAL TUBULAR SYSTEMS

BACKGROUND OF THE INVENTION

In the transmission of electrical energy it has been proposed to use supercooled cables in which the cable elements are carried in a tubular member filled with a coolant such as liquid helium or the like. As means for thermally insulating the cable carrier; additional tubular members are disposed concentrically thereof to provide annular insulating spaces. Usually the innermost and outermost annular spaces are evacuated to maintain vacuum conditions, while an intermediate annular space is filled with liquid nitrogen to subdivide the temperature gradient radially of the insulating system.

Concentric tubular systems are also used for conveying liquids or gases, in which case the inner tubular member is a transmission conduit while the annular space between two tubular members acts as the insulating means for the system. Such space may be evacuated or filled with an insulating foam or the like.

With such concentric tubular systems, spacer means must be provided for maintaining the annular spacing of the tubular members. Known spacers take several forms including helical strips, which however, provide a continuous heat leakage means radially of the system. Thermal losses of such helical strip spacers are minimized by selection of the material from which they are formed, as for example, polytetrafluoroethylene or the like. However, the thermal losses in such construction have been found to be excessive, particularly with supercooled cable installations or multitubular conduit systems.

It has also been suggested to provide spacer means in the form of radially disposed elements extending between each pair of concentric tubular members. Thermal transfer is minimized by selection of the material of the spacer elements, their configuration and the dimensions thereof; taking into account mechanical requirements of the system as a whole. The three or more radial spacer elements are held in their equiangular relationship by ring-shaped connectors concentric with the tubular members. With such spacer arrangement the required mechanical load capacity is readily achieved. However, the thermal losses, while minimized, still excessive for systems showing a substantial radial temperature gradient.

Accordingly, an object of this invention is to provide improved spacer assemblies for concentric tubular systems used for supercooled electric cables or conduits, which utilize minimum amounts of material and are of a configuration to materially reduce areas of contact with the tubular members to further reduce thermal transfer.

Another object of this invention is to provide spacer assemblies of the character described wherein the area of contact are of the point or linear type.

A further object of this invention is to provide spacer assemblies of the character described which lend themselves to high speed, economical installation, utilizing known cable-forming techniques.

Other objects of this invention will in part be obvious and in part hereinafter pointed out.

DESCRIPTION OF THE PREFERRED EMBODIMENTS

Figure 1:
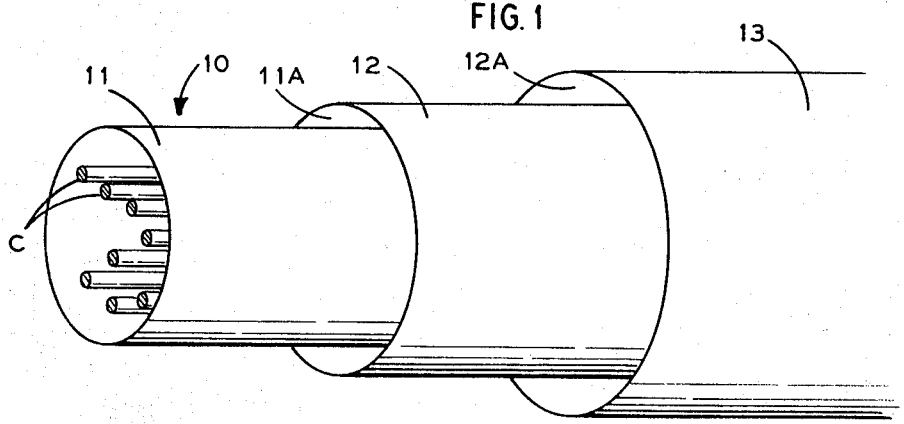
FIG. 1 is a side elevational view showing a multitubular system in concentric arrangement, adapted to use the spacer assemblies of the instant invention.

As shown in FIG. 1, 10 designates a system of concentrically related tubular members indicated at 11, 12 and 13. Such a system may be used for carrying a supercooled electrical cable, in which case, the conductors C are disposed within the inner member 11, which is also filled with liquid helium at a temperature of about 4° K.

In the annular space 12A between tubular members 12, 13 there is provided liquid nitrogen at a temperature of about 77° K., so that in the annular space 11A between members 11, 12 there is a temperature differential of about 70° K., space 11A being evacuated. Thus, there is little heat loss due to convection in space 11A, and radiation losses are minimized by making members 11, 12 of highly reflective metal.

Spacer means is provided in the annular spaces 11A, 12A to maintain members 11, 12 and 13 in concentric relation. Such spacer means must be of a character to minimize heat losses, utilizing materials of very low thermal conductivity, as for example, methyl methacrylate or acrylate.

Figure 2:
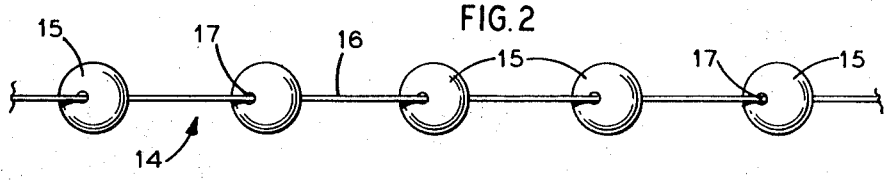
FIG. 2 is a side elevational view of one embodiment of the spacer assembly.
Figure 3:
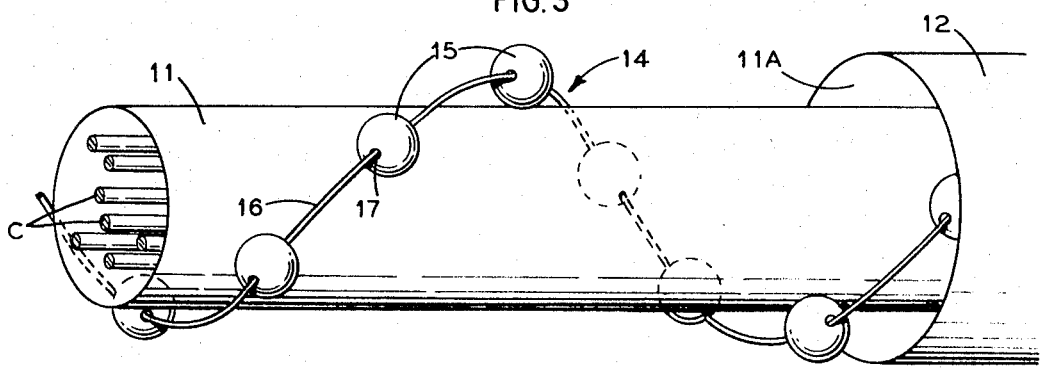
FIG. 3 is a side elevational view showing the spacer assembly associated with a pair of concentric tubular members.
Figure 4:
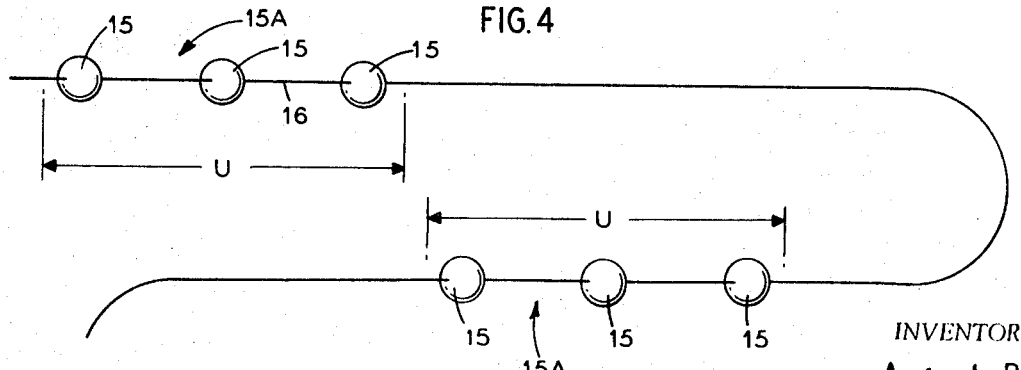
FIG. 4 is a diagrammatic view showing a detail of the spacer assembly.

Thus, as shown in FIG. 2, one spacer assembly is indicated at 14; the same comprising spherical members 15, of methyl methacrylate or the like, preferably hollow, strung on a thread or cord 16 of nylon, by way of diametrically related openings 17 in members 15. The assembly 14 is wound helically about inner tubular member 11, providing spacing means in annular space 11A between members 11, 12, as shown in FIG. 3. The contact areas between spheres 15 and opposed surfaces of members 11, 12 will be practically points and of minimal extent.

As shown in FIG. 3, the spheres 15 are at a uniform spacing along the length of members 11, 12. Alternatively, the spheres 15 may be grouped along cord 16; each group 15A having a linear extent U substantially extending for a single turn about tubular member 11.

Figure 5:
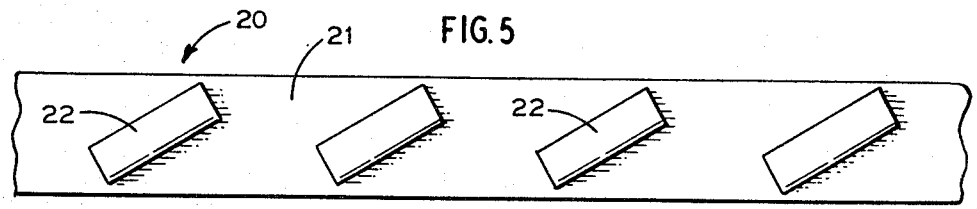
FIG. 5 is a showing in plan and elevation, of another embodiment of the invention.
Figure 5A:
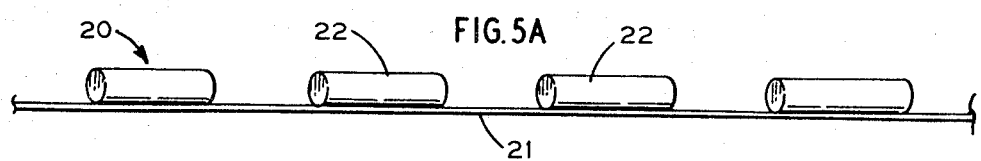

In FIG. 5 there is shown another spacer assembly, indicated at 20, comprising a tapelike member 21 having secured to one surface thereof, longitudinally spaced, hollow, cylindrical members 22; the members 22 being disposed at an angle to the longitudinal extent of tape 21. Members 22 are formed of an insulating material such as methyl methacrylate or the like.

Figure 6:
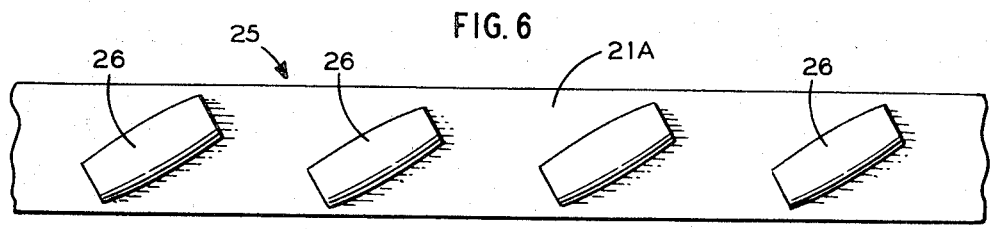
FIG. 6 is a showing similar to that of FIG. 5, of a further embodiment of the invention.
Figure 6A:
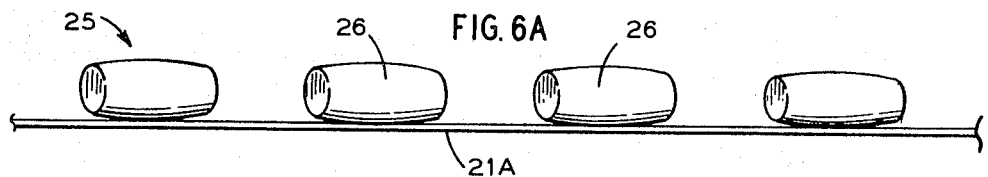

Alternatively, as shown in FIG. 6, tapelike member 21A has secured thereto, spaced barrellike hollow members 26, in an arrangement similar to that shown in FIG. 5; providing a spacer assembly 25. It will be apparent that assemblies 20, 25 may be helically wound on tubular members 11, 12, of FIG. 1, to provide suitable spacer means between members 11, 12 and 13. The spacer members 22, 26 will then be longitudinally aligned in respect to the longitudinal axis of members 11, 12 and 13, with very limited fine line or point contact to materially minimize thermal transfer.

Figure 7:
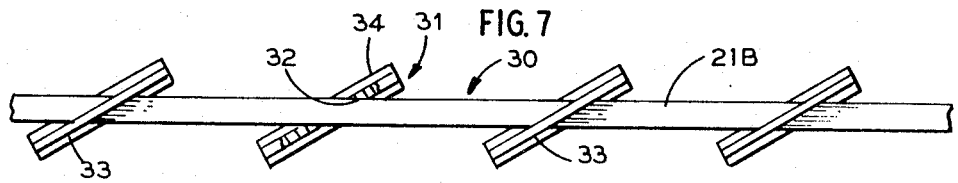
FIG. 7 is a showing similar to that of FIG. 5, of still another embodiment of the invention.
Figure 7A:
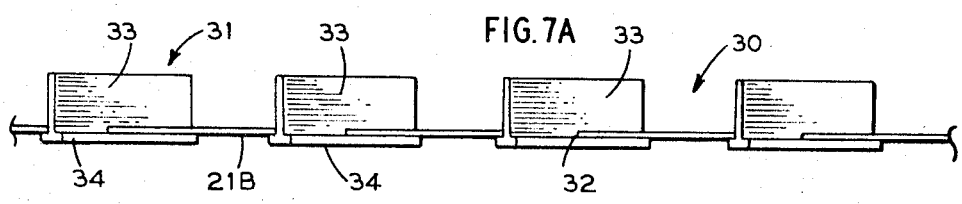

Also, spacer assembly 30 is shown in FIG. 7, wherein tapelike member 21B has mounted thereon, spaced members 31 of inverted T-shape section, and formed with slits 32 at the juncture of web 33 and flange 34. Members 31 are also arranged at an angle to tape 21B, so as to be longitudinally aligned when helically wound between the concentric tubular members 11, 12, 13. Also, the members 31 may be directly adhered to tape 21B by adhesively securing flange portions 34 thereto.

Figure 8:
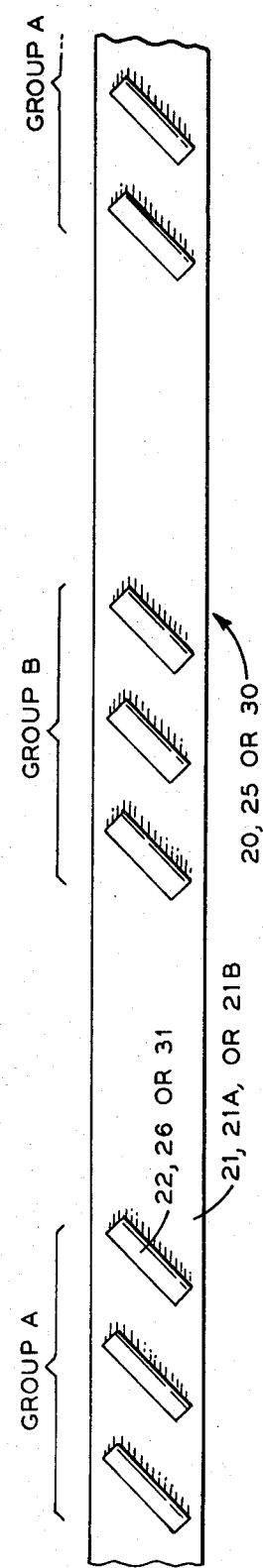
FIG. 8 is a plan view showing a further modification of the invention.

As shown in FIG. 8, spacer members 22, 26 or 31 may be arranged in spaced groups alternating as at A and B, along the tape support 21, 21A or 21B. The spacing of the spacer members in each of groups A and B is such as to allow each group to extend about 1 turn of the circumference of the tubular member 11, or 12.

Also, the radial dimensions of the spacer members in groups A may differ from that of groups B. Thus, with a greater radial dimension in the members of group A, contact will be made with each pair of concentric members 11, 12, 13; whereas with a smaller radial dimension of the members in groups B, the spacer members of such groups will be out of contact with an opposing tubular member. However, with additional loading of the concentric tubular system 10, as for example with bends of substantial radius, the spacer members of smaller dimension will make contact with opposed portions of the tubular members. It is understood that the dual radial dimensions of the spacer members can also apply to spheres 15.

Figure 9:
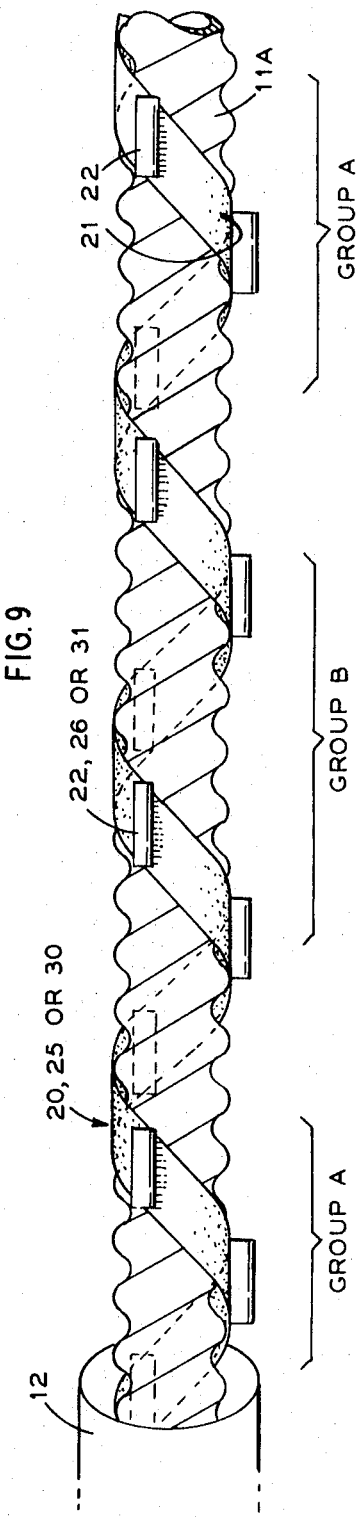
FIG. 9 is a side elevational view showing the application of the spacer assembly of FIG. 8.

As shown in FIG. 9, the spacer assemblies 20, 25 or 30 are helically wound about an inner tubular member 11A which is helically corrugated, to space the same from the outer tubular member 12. The spacer members 22, 26 or 31 of group B have a radial dimension somewhat less then that of the members of group A. The spacer members are now longitudinally aligned and provide high mechanical stability, as well as very limited thermal transfer losses. Tapes 21, 21A and 21B may be formed of polyester, polystyrene, or other low-conductivity material.

I claim:

1. A spacer assembly for a coaxial system of concentric tubular members having annular spaces therebetween and means in said spaces providing a radial temperature gradient between said members, said assembly being disposed in said annular spaces and comprising a plurality of spacer elements of low heat loss material and flexible means for supporting said spacer elements in longitudinally spaced relation to each other, each spacer element having a configuration to provide limited thermal transfer between said spacer elements and contacting surface portions of said tubular members to thereby reduce heat losses radially of said members, said spacer elements being of hollow cylindrical shape and said supporting means comprising a tape member.

2. A spacer assembly as in Claim 1 wherein said spacer elements are disposed with their longitudinal axes at an angle to the longitudinal extent of said tape member.

3. A spacer assembly for a coaxial system of concentric tubular members having annular spaces therebetween and means in said spaces providing a radial temperature gradient between said members, said assembly being disposed in said annular spaces and comprising a plurality of spacer elements of low heat loss material and flexible means for supporting said spacer elements in longitudinally spaced relation to each other, each spacer element having a configuration to provide limited thermal transfer between said spacer elements and contacting surface portions of said tubular members to thereby reduce heat losses radially of said members, said spacer elements being of hollow barrellike shape and said supporting means comprising a tape member.

4. A spacer assembly for a coaxial system of concentric tubular members having annular spaces therebetween and means in said spaces providing a radial temperature gradient between said members, said assembly being disposed in said annular spaces and comprising a plurality of spacer elements of low heat loss material and flexible means for supporting said spacer elements in longitudinally spaced relation to each other, each spacer element having a configuration to provide limited thermal transfer between said spacer elements and contacting surface portions of said tubular members to thereby reduce heat losses radially of said members, said spacer elements being members of inverted T-shaped section.

5. A spacer assembly for a coaxial system of concentric tubular members having annular spaces therebetween and means in said spaces providing a radial temperature gradient between said members, said assembly being disposed in said annular spaces and comprising a plurality of spacer elements of low heat loss material and flexible means for supporting said spacer elements in longitudinally spaced relation to each other, each spacer element having a configuration to provide limited thermal transfer between said spacer elements and contacting surface portions of said tubular members to thereby reduce heat losses radially of said members, said spacer elements being arranged in longitudinally spaced groups.

6. A spacer assembly as in claim 4, wherein the spacer elements in each group are uniformly spaced from each other, the spacing between successive groups of spacer elements being greater than the spacing of elements within each group.

7. A spacer assembly as in claim 6 wherein said assembly is helically disposed in said annular space, the longitudinal extent of each group of spacer elements being sufficient to locate the spacer elements thereof over an angular extent of 360° of said annular space.

8. A spacer assembly as in claim 6 wherein the spacer elements in one group have a transverse dimension different from that of spacer elements in another group.

9. A spacer assembly as in claim 8, wherein the groups of spacer elements of different transverse dimension are in alternating relation.

* * * * *